Jan. 5, 1943.   P. L. ABBOTT   2,307,656
NUT GRADING AND CRACKING MACHINE
Filed Jan. 3, 1941   3 Sheets-Sheet 1

Perry L. Abbott
INVENTOR.
BY
ATTORNEY.

Jan. 5, 1943.　　　　　P. L. ABBOTT　　　　　2,307,656
NUT GRADING AND CRACKING MACHINE
Filed Jan. 3, 1941　　　3 Sheets-Sheet 2
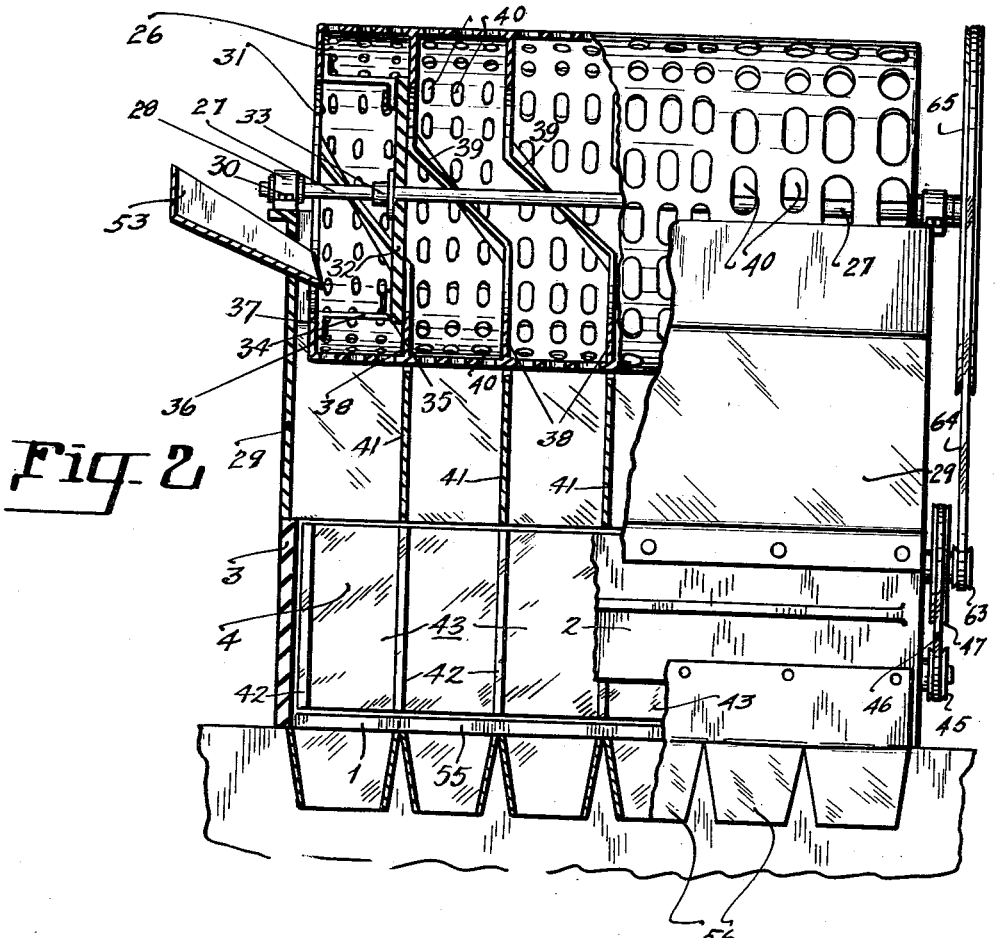
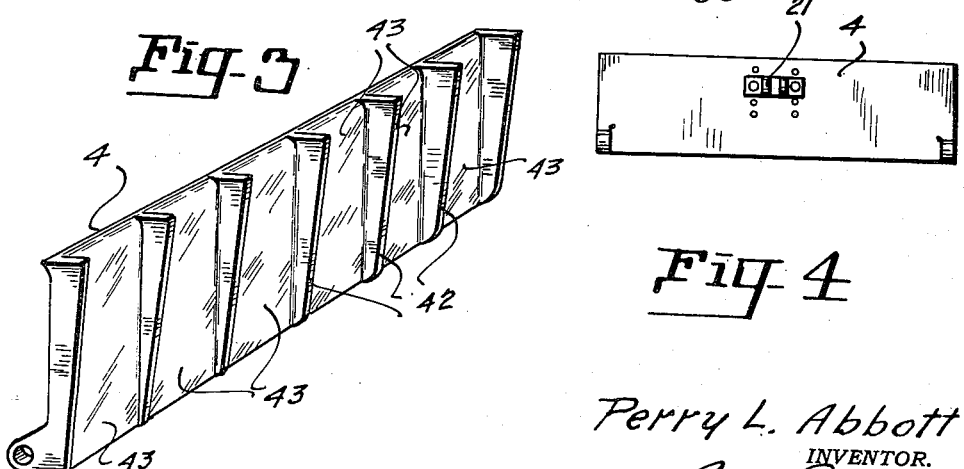
Perry L. Abbott
INVENTOR.
BY
ATTORNEY.

Jan. 5, 1943.  P. L. ABBOTT  2,307,656
NUT GRADING AND CRACKING MACHINE
Filed Jan. 3, 1941  3 Sheets-Sheet 3
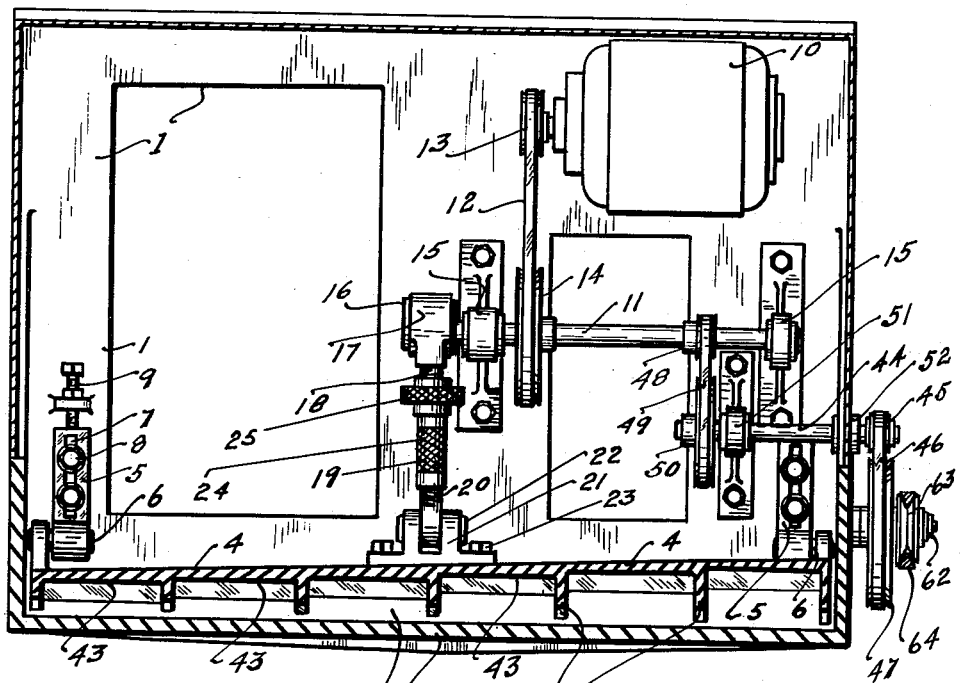
Fig. 5
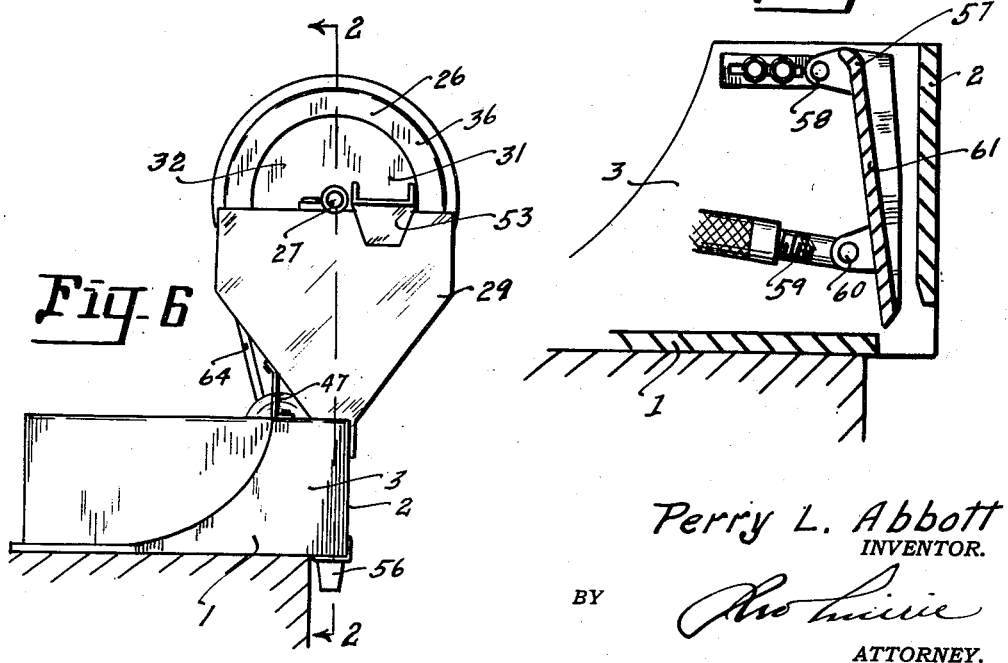
Fig. 6
Fig. 7
Perry L. Abbott
INVENTOR.
BY
ATTORNEY.

Patented Jan. 5, 1943

2,307,656

UNITED STATES PATENT OFFICE 2,307,656

NUT GRADING AND CRACKING MACHINE

Perry L. Abbott, Portland, Oreg.

Application January 3, 1941, Serial No. 373,025

6 Claims. (Cl. 146—12)

This invention relates to nut grading and cracking machines and is particularly adapted for grading and cracking filberts and the like.

The primary object of the invention is to design a machine that will crack and remove the shells from filberts and the like without breaking the meat.

Another object of the invention is to design a machine for grading the nuts before cracking, delivering the different grades within the machine to the cracking mechanism, said cracking mechanism being graduated in proportions for cracking the different sized nuts simultaneous in one continuous flow of nuts to be processed.

In the cracking of filberts and the like best results can be obtained on compressing the shell of the nut within limits sufficient to crack the shell and still not injure the meat.

The general run of nuts of this character vary considerable in size, therefore, in order to effectively crack the shells and not injure the meats, it becomes necessary to grade the nuts.

In my new and improved machine, the grading takes place within the machine. After the nuts have been graded they are delivered between cracking jaws, these jaws having a predetermined clearance suitable to receive and properly crack the graded nuts delivered thereto, in order to accommodate the machine to a number of different grades of nuts the cracking jaws are graduated into sections, each section having a different clearance to receive the different grades of nuts to be cracked. This feature is the outstanding object of my invention, regardless of whether the nuts are graded within my machine or delivered thereto from another grading machine.

These and other incidental objects will be apparent in the drawings, specification and claims.

Referring to the drawings:

Figure 2 is an end elevation, partially in section, said section being taken on line 2—2 of Figure 6, looking in the direction indicated.

Figure 3 is a detail prospective end view of my new and improved graduated nut cracking jaw, which is mounted within the machine.

Figure 4 is a rear view of said cracking jaw made to illustrate an adjusting feature for controlling the stroke of the jaw.

Figure 5 is a plan sectional view, taken on line 5—5 of Figure 1, looking in the direction indicated.

Figure 6 is an assembled side elevation of my new and improved nut grading and cracking machine.

Figure 7 is a fragmentary detailed sectional view of another preferred form of mounting the nut cracking jaw within the machine.

In the drawings:

Figure 1:
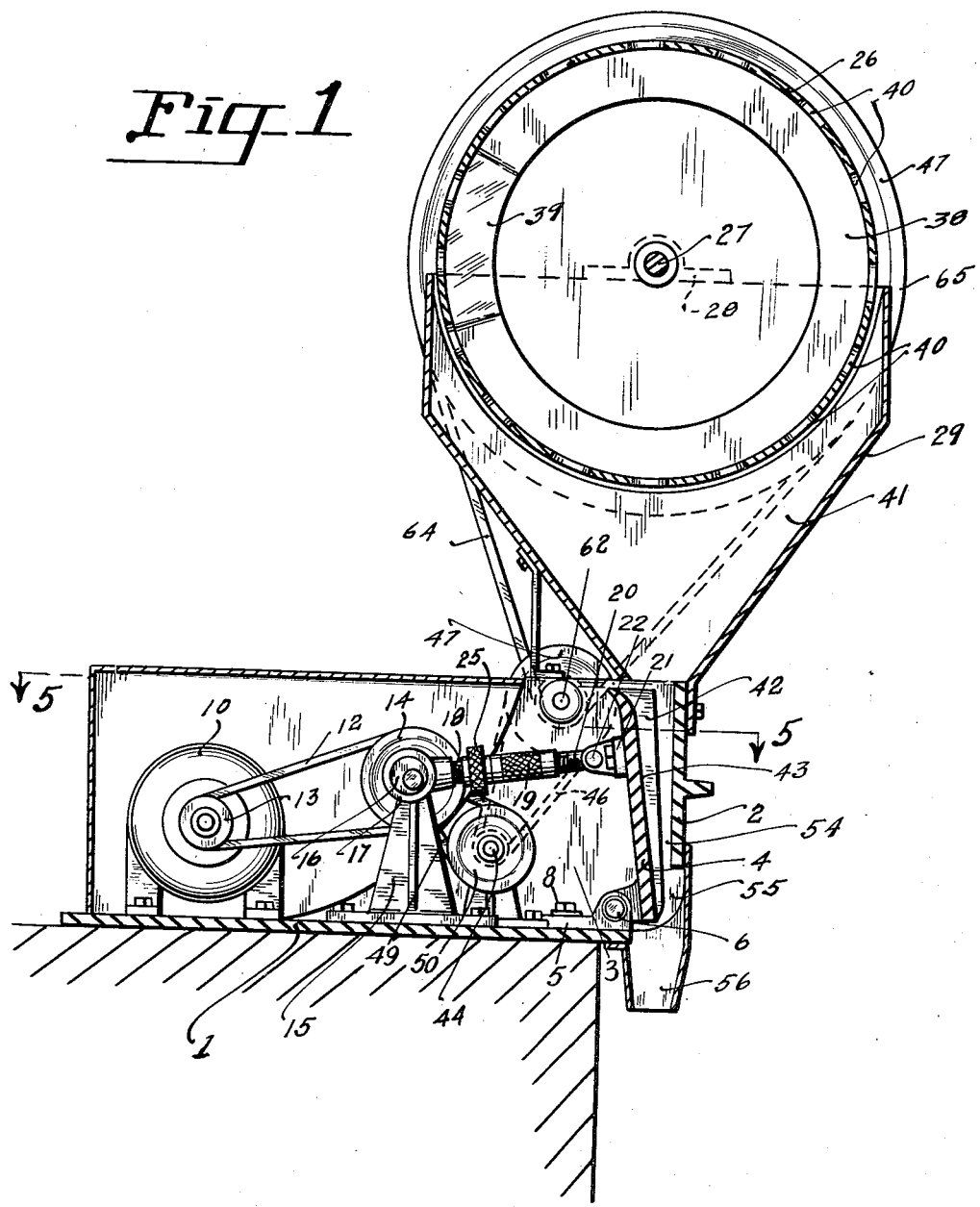
Figure 1 is a sectional side elevation of my new and improved nut grader and cracking machine.

My new and improved nut grading and cracking machine consists of a base 1, having a vertical stationary cracking jaw 2 mounted at right angles thereto and held in this position by the end walls 3. In the drawings I have illustrated this assembly as being one solid casting, but I do not wish to be limited to this particular construction.

Pivotally mounted upon the base 1 and adjacent the jaw 2 is a movable cracking jaw 4, this jaw is pivotally mounted to the adjustable bearing bracket 5 at 6. The bearing bracket 5 is adjustable relative to the base 1 in the following manner.

A slot 7 is provided within the bearing bracket 5 for end adjustment of the block, the block is locked in place by the locking bolts 8 and is prevented from sliding endwise by the set screw 9. The object of providing an adjustment of the bearing block 5 is to permit the cracking jaw 4 to be adjusted relative to its distance from the stationary jaw 2, adapting the machine to be used for different sized nuts. The cracking jaw 4 is opened and closed relative to the jaw 2 in the following manner.

A motor 10 is mounted to the base 1 of the machine and drives the countershaft 11 through the belt 12 and pulleys 13 and 14. The countershaft 11 is journaled within suitable bearing blocks 15 and may be of the usual construction. An eccentric 16 is fixedly mounted to the end of the shaft 11 and has an eccentric strap 17 therearound. Extending from this strap is a threaded boss 18, upon which is threaded the sleeve 19. Within the opposite end of the sleeve 19 is threaded the eye-bolt 20. The eye-bolt 20 is pivotally journaled to the adjustable bearing block 21 by the pin 22. The bearing block 21 is secured to the cracking jaw 4 by the holding bolts 23.

The object of providing the threaded sleeve 19 is to adjust the length of the connecting link assembly 24 for determining the operating clearance between the cracking jaw 4 and the stationary jaw 2, this connecting link assembly is locked in adjusted position by the locking nut 25. In the operation of the cracking jaw 4, the eccentric 17 will oscillate the connecting link 24 opening and closing the cracking jaw 4 relative to the stationary jaw 2. Again I do not wish to be limited to this form of operating mechanism, as other mechanical means may be employed.

I will now describe the grading mechanism of my new and improved nut grading and cracking machine. A cylindrical screen 26 is mounted to a horizontal shaft 27, the shaft 27 is journaled within suitable bearings 28, which rest upon the hopper 29, and are secured thereto by a suitable fastening means, as bolts 30, the end of the screen 26 is open at 31. Inwardly from the opening 31 is a disc 32 mounted to the shaft 27 at 33, this disc supports the screen through the brackets 34, said brackets 34 are secured to the disc 32 at 35 and to the flange 36 at 37.

Within the screen 26 are circular inwardly extending flanges 38, these flanges act as guides for directing the nuts over the inner surface of the screen. Flanges 38 are offset through a portion of their length at 39, these offsets are for the purpose of shifting the nuts longitudinally of the screen. The screen 26 has openings 40, these openings gradually increase in size from the feed end of the screen or opening 31 until they reach the opposite end of the screen.

Extending downwardly within the hopper 29 are partitions 41 registering with the circular flanges 38, between which the different size holes 40 direct the graded nuts between the partitions 41 to the cracking jaws 2 and 4.

Referring especially to Figures 3 and 5, the cracking jaw 4 has partitions 42 vertical its face, and the space between these partitions receive the graded nuts from the hopper 29. Referring now especially to Figure 5, it will be noted that the faces 43 of the jaw 4 are located a different distance from the stationary jaw 2, the distance increasing from left to right. This is the high spot of the invention, providing a cracking jaw graduated to crack different sized nuts simultaneously.

The screen 26 is driven from the countershaft 44 through the drive pulley 45, belt 46 and driven pulley 47, said pulley 47 being keyed to the shaft 62. A pulley 63 is also keyed to the shaft 62 and drives the belt 64, which is trained about the pulley 65, said pulley 65 is fixedly mounted to the shaft 27 of the screen 26. The countershaft 44 is driven from the countershaft 11 by the driving pulley 48, belt 49 and driven pulley 50. The countershaft 44 is mounted within suitable bearings 51 and 52. I do not wish to be limited to the particular driving mechanism, as any speed reducing system could be employed to rotate the screen 26 slowly.

I will now describe a complete cycle of operation of the machine, a chute 53 delivers the nuts through the opening 31 of the grading screen 26, the nuts are then fed longitudinally of the screen by the circular flanges 38 and their offsets at 39. The graduated nuts are then delivered by the hopper 29 between the partitions 41 into the space 54 between the jaws 2 and 4 and against the graduated faces 43 of the cracking jaws. The cracking jaw 4 is oscillated at a high rate of speed by the connecting link 24 operated by the eccentric mechanism, as heretofore described, the nuts are then delivered through the bottom of the jaws at 55 into the chutes 56. In order to change the stroke of the cracking jaw 4, the bearing block 21 is moved up or down on the rear face of the jaw 4, best illustrated in Figure 4. This adjustment will change the stroke of the jaw for different sized nuts to be cracked.

Referring to Figure 7, I show another preferred principle of mounting the cracking jaw, the upper side of the jaw 57 is pivotally mounted at 58, while the connecting link 59 is pivotally mounted at 60 to the lower edge of the jaw 61, in other words in this construction I have inverted the cracking jaw to what I have illustrated in my general construction, as in some cases this may prove to be the better principle of operation.

I do not wish to be limited to the particular mechanical construction illustrated in the drawings and specification, as other forms of mechanical equivalents may be adapted to the principles claimed for my invention.

What is claimed as new is:

1. A nut cracker for cracking nuts of different sizes comprising two substantially vertical planar crushing surfaced jaw members, one positioned in front of the other and facing the same to crack nuts therebetween, means for moving one of the jaws toward and from the other jaw, one of said jaws having a plurality of planar cracking surfaces located at different distances from the face of the opposite jaw, partitions extending vertically and at right angles to one of the jaw faces to separate the cracking surfaces above mentioned, one from the other, said partitions extending toward the opposite jaw a distance sufficient to guide the nuts in separate paths according to their size but insufficient to interfere with the movement of the jaws, and means for feeding nuts of different sizes to the respective jaws.

2. A nut cracker for cracking nuts of different sizes, comprising two relatively-movable crushing jaws, the first jaw having a nut-cracking face in one fixed plane, the second jaw having an integral nut-cracking area comprising a plurality of independent relatively-fixed nut-cracking faces for cooperation with the nut-cracking face of the first jaw, the independent cracking faces of the second jaw being in fixed planes relatively offset longitudinally of the jaw with respect to the plane of the first jaw, means on the second jaw for segregating the material cooperating with one cracking face from that cooperating with another such face, and a single adjustable means for operating one of the jaws relative to the other.

3. A construction as defined in claim 2, wherein the segregating means for the second jaw includes partitions extending beyond the cracking faces of the second jaw toward the first jaw to prevent any possible contact between the cracking faces of the respective jaws, whereby to insure in operation the cracking of the shells of the nuts without material crushing of the nut-meats.

4. A construction as defined in claim 2, wherein the cracking faces of the second jaw are spaced at varying distances from the plane of the cracking face of the first jaw, with such distances progressively increasing from one end of the second jaw to the other end.

5. A construction as defined in claim 2, wherein the operating means for one of the jaws includes an eccentrically-driven element connected to and operating one of the jaws, said element being longitudinally adjustable to simultaneously and similarly adjust all independent cracking faces of one jaw relative to the single cracking face of the other jaw.

6. A construction as defined in claim 2, wherein the first jaw is fixed and the second jaw is movable toward and from the fixed jaw.

PERRY L. ABBOTT.